United States Patent [19]

Dominguez

[11] Patent Number: 4,474,901

[45] Date of Patent: Oct. 2, 1984

[54] REACTION INJECTION MOLDED ELASTOMERS MADE USING HIGH MOLECULAR WEIGHT AMINE TERMINATED POLYETHERS AND SMALL AMOUNTS OF LOW MOLECULAR WEIGHT AMINE TERMINATED POLYETHERS

[75] Inventor: Richard J. G. Dominguez, Austin, Tex.

[73] Assignee: Texaco Inc., White Plains, N.Y.

[21] Appl. No.: 502,389

[22] Filed: Jun. 8, 1983

[51] Int. Cl.³ ............................................. C08G 18/14
[52] U.S. Cl. ..................................... 521/163; 521/167; 528/76; 528/77
[58] Field of Search .................. 521/163, 167; 528/76, 528/77

[56] References Cited

U.S. PATENT DOCUMENTS

| | | | |
|---|---|---|---|
| 3,838,076 | 9/1974 | Moss et al. | 521/163 |
| 4,218,543 | 8/1980 | Weber et al. | 521/51 |
| 4,246,363 | 1/1981 | Turner et al. | 521/163 |
| 4,254,069 | 3/1981 | Dominguez et al. | 264/51 |
| 4,269,945 | 5/1981 | Vanderhider et al. | 521/159 |
| 4,272,618 | 6/1981 | Dominguez et al. | 521/160 |

*Primary Examiner*—Maurice J. Welsh
*Attorney, Agent, or Firm*—Robert A. Kulason; Jack H. Park; Kenneth R. Priem

[57] ABSTRACT

The invention relates to reaction injection molded elastomers derived from high molecular weight amine terminated polyethers having greater than 50 percent of their active hydrogens in the form of amine hydrogens, low molecular weight amine terminated polyethers and a polyisocyanate. The reaction injection molded (RIM) elastomers of this invention are useful, for example, as automobile body parts.

8 Claims, No Drawings

REACTION INJECTION MOLDED ELASTOMERS MADE USING HIGH MOLECULAR WEIGHT AMINE TERMINATED POLYETHERS AND SMALL AMOUNTS OF LOW MOLECULAR WEIGHT AMINE TERMINATED POLYETHERS

This application is related to application Ser. No. 371,160, now U.S. Pat. No. 4,433,067; application Ser. No. 371,161 (now allowed), now U.S. Pat. No. 4,396,729; application Ser. No. 371,376, now U.S. Pat. No. 4,444,910; and application Ser. No. 371,377, now abandoned, all filed Apr. 23, 1982. Applications Ser. No. 502,382, and Ser. No. 502,397 now U.S. Pat. No. 4,448,904, both filed of even date, are also related.

BACKGROUND OF THE INVENTION

1. Field of the Invention

This invention concerns the field of reaction injection molded elastomers.

2. Description of the Prior Art

Vanderhider's U.S. Pat. No. 4,269,945 claims a process for preparing RIM polyurethanes wherein a relatively high molecular weight hydroxyl containing polyol, a chain extender and a polyisocyanate are used. The chain extender may be an aliphatic amine containing material having at least one primary amine group such as those useful in the present invention.

Turner's U.S. Pat. No. 4,246,363 claims a RIM polyurethane composition derived from using at least three different polyols (including amine terminated polyethers) having specific relationships and reactivity and solubility parameters to one another.

Our U.S. Pat. Nos. 4,254,069 and 4,272,618 concern the curing of RIM polyurethane elastomers. In the Glossary of these patents, a "polyol" is defined as a di- or greater functionality high molecular weight alcohol or an amine terminated molecule composed of ether groups. In the discussion of chain extenders in these patents, amines, including aromatic diamines, are disclosed. However, the actual examples are of polyether polyurethanes using polyols (hydroxyl terminated) of high molecular weight. The chain extender, monoethanolamine, was used as a crosslinker.

U.S. Pat. No. 3,838,076 discloses foams made from amine terminated polyethers, wherein the amine termination ranges from 10 to 50 percent. U.S. Pat. No. 3,847,997 is related but the amine termination ranges from 15 to 55 percent.

Quillery's U.S. Pat. No. 3,523,918 describes the use of amine chain extenders for the preparation of integral skin foams. Also, Bayer's U.S. Pat. No. 4,218,543 describes the use of high molecular weight polyols, certain aromatic diamines and isocyanates for the production of RIM parts. This Bayer patent specifically claims as a chain extender 1-methyl-3,5-diethyl-2,4-diaminobenzene (diethyltoluene diamine) and its isomer.

SUMMARY OF THE INVENTION

The invention is reaction injection molded (RIM) elastomer comprising a cured reaction product of primary or secondary amine terminated polyethers of greater than 2,500 molecular weight having greater than 50 percent of their active hydrogens in the form of amine hydrogens, amine terminated polyethers of less than 1,000 molecular weight and an aromatic polyisocyanate catalyst. The invention is also a method of preparation of a RIM polyurea elastomer as described above.

DESCRIPTION OF THE PREFERRED EMBODIMENTS

The high molecular weight amine terminated polyethers useful in this invention include, for example, primary and secondary amine terminated polyether polyols of greater than 2,500 average molecular weight having from 2 to 6 functionality, preferably from 2 to 3, and an amine equivalent weight from about 1,250 to about 4,000. Mixtures of amine terminated polyethers may be used. It is preferred that the high molecular weight amine terminated polyether have a molecular weight of about 4,000 or more.

The high amine terminated polyether resins useful in this invention are polyether resins made from an appropriate initiator to which lower alkylene oxides such as ethylene oxide, propylene oxide, butylene oxide or mixtures thereof are added with the resulting hydroxyl terminated polyol then being aminated. When two or more oxides are used, they may be present as random mixtures or as blocks of one or the other polyether. In the amination step it is highly desirable that the terminal hydroxyl groups in the polyol be essentially all secondary hydroxyl groups for ease of amination. Normally, the amination step does not completely replace all of the hydroxyl groups. However, the majority of hydroxyl groups are replaced by amine groups. Therefore, the amine terminated polyether resins useful in this invention have greater than 50 percent of their active hydrogens in the form of amine hydrogens. If ethylene oxide is used it is desirable to cap the hydroxyl terminated polyol with a small amount of higher alkylene oxide to ensure that the terminal hydroxyl groups are essentially all secondary hydroxyl groups. The polyols so prepared are then reductively aminated by prior art techniques, for example, as outlined in U.S. Pat. No. 3,654,370, incorporated herein by reference.

In the practice of this invention, a single high molecular weight amine terminated polyether resin may be used. Also, mixtures of high molecular weight amine terminated polyols such as mixtures of di- and trifunctional materials and/or different molecular weight or different chemical composition materials may be used.

Low molecular weight amine terminated polyethers useful in this invention include those represented by the following formula:

where R = an initiating radical for oxyalkylation having a functionality of from about 2 to 6; y = oxyalkylene, including oxyethylene, oxypropylene and/or oxybutylene; x = about 2 to 15 and wherein the molecular weight is less than about 1,000.

Specific low molecular weight amine terminated polyethers useful in this invention include but are not limited to those shown below. The first low molecular weight amine terminated polyether is the reaction product of trimethylpropane with propylene oxide containing terminal amine groups represented by the formula

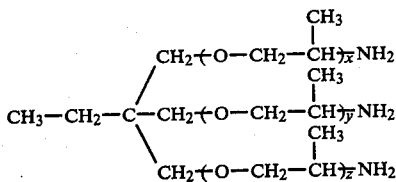

wherein x+y+z has a value of about 5.3. The average amine hydrogen equivalent weight is about 67 and the product is commercially available from Texaco Chemical Company as JEFFAMINE ®T-403.

Another useful amine terminated polyether is an aminated polyoxypropylene glycol represented by the formula

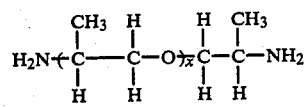

wherein x has a value of about 5.6. This product has an average amine hydrogen equivalent weight of about 100 and is commercially available from Texaco Chemical Company as JEFFAMINE D-400.

Another useful amine terminated polyether has the same general formula as above but x has an average value of about 2.6. This product has an average amine hydrogen equivalent weight of about 57.5 and is commercially available from Texaco Chemical Company as JEFFAMINE D-230.

In a preferred embodiment of the invention, the low molecular weight amine terminated polyether has a functionality of 3 or more.

In another preferred embodiment of the invention, the low molecular weight amine terminated polyether is trifunctional. In a particularly preferred embodiment, it is the same as or similar to JEFFAMINE T-403, the structure of which is shown above.

Where a trifunctional product similar to JEFFAMINE T-403 is used, the amount of low molecular weight amine terminated polyether may range from as little as 0.3 to about 2.5% of the total formulation in order to achieve a significant green strength improvement. Where products similar to JEFFAMINE D-230 and JEFFAMINE D-400 are used, higher quantities ranging from about 1% to about 10% of the total formulation are necessary to achieve significant green strength improvement. It is recognized that in some formulations these ranges may vary.

In one embodiment of this invention chain extenders are used. For example, diols (ethylene glycol and 1,4-butanediol), amines and alcohol amines are useful. In a preferred embodiment aromatic diamine chain extenders are used in this invention including, for example, 1-methyl-3,5-diethyl-2,4-diaminobenzene, 1-methyl-3,5-diethyl-2-6 diaminobenzene (both of these materials are also called diethyltoluene diamine or DETDA), 1,3,5-triethyl-2,6 diaminobenzene, 3,5,3',5'-tetraethyl-4,4" diaminodiphenylmethane and the like. Particularly preferred aromatic diamine chain extenders are 1-methyl-3,5-diethyl-2,4 diaminobenzene or a mixture of this compound with 1-methyl-3,5-diethyl-2,6 diaminobenzene. It is within the scope of this invention to include some aliphatic chain extender materials as described in U.S. Pat. Nos. 4,246,363 and 4,269,945.

A wide variety of aromatic polyisocyanates may be used here. Typical aromatic polyisocyanates include p-phenylene diisocyanate, polymethylene polyphenylisocyanate, 2,6-toluene diisocyanate, dianisidine diisocyanate, bitolylene diisocyanate, naphthalene-1,4-diisocyanate, bis(4-isocyanatophenyl)methane, bis(3-methyl-3-isocyantophenyl)methane, bis(3-methyl-4-isocyanatophenyl)methane, and 4,4'-diphenylpropane diisocyanate.

Other aromatic polyisocyanates used in the practice of the invention are methylene-bridged polyphenyl polyisocyanate mixtures which have a functionality of from about 2 to about 4. These latter isocyanate compounds are generally produced by the phosgenation of corresponding methylene bridged polyphenyl polyamines, which are conventionally produced by the reaction of formaldehyde and primary aromatic amines, such as aniline, in the presence of hydrochloric acid and/or other acidic catalysts. Known processes for preparing polyamines and corresponding methylene-bridged polyphenyl polyisocyanates therefrom are described in the literature and in many patents, for example, U.S. Pat. Nos. 2,683,730; 2,950,263; 3,012,008; 3,344,162 and 3,362,979.

Usually methylene-bridged polyphenyl polyisocyanate mixtures contain about 20 to about 100 weight percent methylene diphenyldiisocyanate isomers, with the remainder being polymethylene polyphenyl diisocyanates having higher functionalities and higher molecular weights. Typical of these are polyphenyl polyisocyanate mixtures containing about 20 to 100 weight percent methylene diphenyldiisocyanate isomers, of which 20 to about 95 weight percent thereof is the 4,4'-isomer with the remainder being polymethylene polyphenyl polyisocyanates of higher molecular weight and functionality that have an average functionality of from about 2.1 to about 3.5. These isocyanate mixtures are known, commercially available materials and can be prepared by the process described in U.S. Pat. No. 3,362,979, issued Jan. 9, 1968 to Floyd E. Bentley.

By far the most preferred aromatic polyisocyanate is methylene bis(4-phenylisocyanate) or MDI. Pure MDI, quasi-prepolymers of MDI, modified pure MDI, etc. Materials of this type may be used to prepare suitable RIM elastomers. Since pure MDI is a solid and, thus, often inconvenient to use, liquid products based on MDI are often used and are included in the scope of the terms MDI or methylene bis(4-phenylisocyanate) used herein. U.S. Pat. No. 3,394,164 is an example of a liquid MDI product. More generally uretonimine modified pure MDI is included also. This product is made by heating pure distilled MDI in the presence of a catalyst. The liquid product is a mixture of pure MDI and modified MDI:

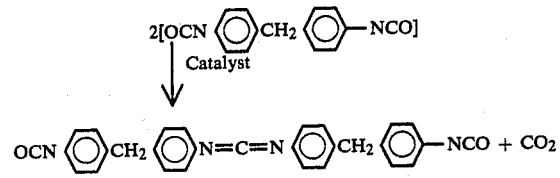

-continued

Carbodiimide

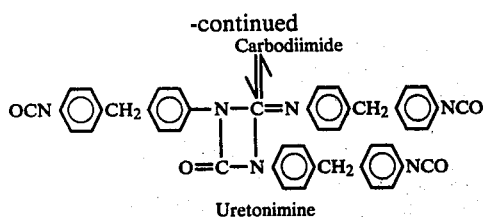

Uretonimine

Examples of commercial materials of this type are Upjohn's ISONATE ®125M (pure MDI) and ISONATE 143L ("liquid" MDI). Preferably the amount of isocyanates used is the stoichiometric amount based on all the ingredients in the formulation or greater than the stoichiometric amount.

Of course, the term polyisocyanate also includes quasi-prepolymers of polyisocyanates with active hydrogen containing materials.

The organometallic compound may suitably be a stannous or stannic compound, such as a stannous salt of a carboxylic acid, a trialkyltin oxide, a dialkyltin dihalide, a dialkyltin oxide, etc., wherein the organic groups of the organic portion of the tin compound are hydrocarbon groups containing from 1 to 8 carbon atoms. For example, dibutyltin dilaurate, dibutyltin diacetate, diethyltin diacetate, dihexyltin diacetate, di-2-ethylhexyltin oxide, dioctyltin dioxide, stannous octoate, stannous oleate, etc., or a mixture thereof, may be used.

Other conventional formulation ingredients may be employed as needed such as; for example, foam stabilizers, also known as silicone oils or emulsifiers. The foam stabilizers may be an organic silane or siloxane. For example, compounds may be used having the formula:

$$RSi[O—(R_2SiO)_n\text{-(oxyalkylene)}_mR]_3$$

wherein R is an alkyl group containing from 1 to 4 carbon atoms; n is an integer of from 4 to 8; m is an integer of from 20 to 40; and the oxyalkylene groups are derived from propylene oxide and ethylene oxide. See, for example, U.S. Pat. No. 3,194,773.

Reinforcing materials, if desired, useful in the practice of our invention are known to those skilled in the art. For example, chopped or milled glass fibers, chopped or milled carbon fibers and/or other mineral fibers are useful.

Post curing of the elastomer of the invention is optional. Post curing will improve some properties such as heat sag. Employment of post curing depends on the desired properties of the end product.

The examples which follow exemplify this invention. However, these examples are not intended to limit the scope of the invention.

EXAMPLE I

The following formulation

| B-Component | |
|---|---|
| JEFFAMINE T-5000, pbw | 62.33 |
| Diethyltoluenediamine, pbw | 17.7 |
| Dow-Corning Q2-7119 Fluid, pbw | 0.7 |
| A-Component | |
| Upjohn Code 205 Isocyanate (2 ISONATE ® 143L/1 THANOL ® SF-5505), pbw | 54.9 | was processed in a RIM machine (Accuratio VR-100) and the mold was opened at 12 seconds after injection began. The part split when folded and bent. When 0.5 pbw JEFFAMINE T-403 was added the splitting was not as bad. When 0.75 pbw JEFFAMINE T-403 was added hardly any splitting was noticed. Thus, this small change (0.75 pbw JEFFAMINE T-403) produced a very significant enhancement of this very important property.

EXAMPLE II

The following formulation was reaction injection molded in an Accuratio VR-100 RIM machine.

| B-Component | |
|---|---|
| JEFFAMINE T-5000, pbw | 32.2 |
| Diethyltoluenediamine, pbw | 17.7 |
| Dow-Corning Q2-7119 Fluid, pbw | 0.7 |
| A-Component | |
| Upjohn Code 231 Isocyanate, pbw | 73.7 |

The hot tear (30 seconds close mold, 20 seconds after mold opens) of the material was 7.4 pounds. When 1 pbw of JEFFAMINE T-403 was added to the above formulation, the hot tear increases to 8.5 pounds.

EXAMPLE III

| B-Component | |
|---|---|
| JEFFAMINE T-5000, pbw | 62.33 |
| Diethyltoluenediamine, pbw | 18.9 |
| Dow-Corning Q2-7119 Fluid, pbw | 0.7 |
| A-Component | |
| Upjohn Code 205 Isocyanate, pbw | 57.5 |

When the above formulation was processed in a RIM machine (Accuratio VR-100) and the mold was opened in 30 seconds, a hot tear test was performed an additional 20 seconds (50 seconds total) later. The hot tear strength was then measured on a Chattilion gauge. The test gave a 7 pounds hot tear. When 5 pbw of JEFFAMINE D-400 was added to the above formulation, a hot tear of 8.6 pounds was measured.

EXAMPLE IV

The following formulation was reaction injection molded in an Accuratio VR-100 RIM machine.

| B-Component | |
|---|---|
| JEFFAMINE T-5000, pbw | 57.22 |
| JEFFAMINE T-3000, pbw | 5.0 |
| Diethyltoluenediamine, pbw | 17.7 |
| Dow-Corning Q2-7119 Fluid, pbw | 0.7 |
| A-Component | |
| Upjohn Code 205 Isocyanate, pbw | 54.5 |

The above material had a hot tear of 7 pounds. This is an increase in tear over the hot tear of an all JEFFAMINE T-5000 system which would be about 5.5 pounds (as per previous example).

EXAMPLE V (Comparative)

| B-Component | |
|---|---|
| JEFFAMINE T-5000, pbw | 37 |
| JEFFAMINE T-3000, pbw | 25.33 |
| Diethyltoluenediamine, pbw | 17.7 |
| Dow-Corning Q2-7119 Fluid, pbw | 0.7 |
| A-Component | |

| -continued | |
|---|---|
| Upjohn Code 205 Isocyanate, pbw | 57 |

When the above material was run on a RIM machine and the hot plaque tear was measured 8.9 pound of hot plaque tear results. This compares to a hot plaque tear of 5.5 pounds for the same formulation where all the high molecular weight JEFFAMINE product is JEFFAMINE T-5000.

GLOSSARY OF TERMS AND MATERIALS

Upjohn Code 205 Isocyanate—Two parts of ISONATE 143L to one part of THANOL ®SF-5505
ISONATE ®143L—Carbodiimide modified liquid MDI, a product of the Upjohn Co.
JEFFAMINE ®T-3000—Polypropylene oxide triamine of about 3,000 molecular weight; Texaco Chemical Co.
JEFFAMINE T-5000—Polypropylene oxide triamine of about 5,000 molecular weight; Texaco Chemical Co.
DETDA—Diethyltoluene diamine, a product of Ethyl Corp.
THANOL SF-5505—A 5500 molecular weight polyether triol containing approximately 80% primary hydroxyl groups; Texaco Chemical Co.
Dow-Corning Q2-7119—Dimethyl siloxane with organic acid groups. An internal mold release agent; Dow-Corning Corp.
Upjohn Code 231 Isocyanate—50:50 blend of liquid MDI (similar to ISONATE 143L but with higher 4,4' isomer MDI) and THANOL SF-5505

I claim:

1. A reaction injection molded elastomer made by reacting in a closed mold high molecular weight amine terminated polyethers of greater than about 2,500 average molecular weight, low molecular weight amine terminated polyethers of the formula $R(y)_xNH_2$ where R=an initiating radical for oxyalkylation having a functionality of from about 2 to 6; y=oxyalkylene, including oxyethylene, oxypropylene and/or oxybutylene; x=about 2 to 15 wherein the molecular weight is less than about 1,000, and a polyisocyanate.

2. An elastomer as in claim 1 wherein the high molecular weight amine terminated polyethers have an average molecular weight of about 4,000 or more.

3. An elastomer as in claim 1 wherein the low molecular weight amine terminated polyether is a triamine of about 400 molecular weight.

4. A reaction injection molded elastomer made by reacting in a closed mold high molecular weight amine terminated polyethers of greater than about 2,500 average molecular weight, lower molecular weight amine terminated polyether wherein the low molecular weight amine terminated polyether is trifunctional and has a molecular weight of less than about 1,000 and a polyisocyanate.

5. An elastomer as in claim 4 wherein the high molecular weight amine terminated polyethers have an average molecular weight of about 4,000 or more.

6. An elastomer as in claim 4 wherein the low molecular weight amine terminated polyether is a triamine of about 400 molecular weight.

7. A reaction injection molded elastomer made by reacting in a closed mold high molecular weight amine terminated polyethers of greater than about 2,500 molecular weight, a low molecular weight amine terminated polyether of the formula

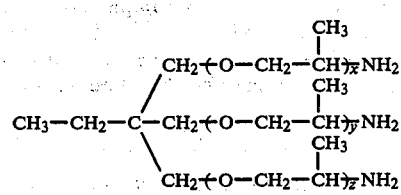

wherein x+y+z=about 5.3.

8. An elastomer as in claim 7 wherein the high molecular weight amine terminated polyethers have an average molecular weight of about 4,000 or more.

* * * * *